United States Patent [19]

Kawakami et al.

[11] Patent Number: 5,028,849
[45] Date of Patent: Jul. 2, 1991

[54] DEVICE FOR MEASURING CONVERGENCE OF COLOR CATHODE RAY TUBE

[75] Inventors: Yuichi Kawakami; Teruo Ichikawa; Hiroshi Furukawa, all of Osaka, Japan

[73] Assignee: Minolta Camera Kabushiki Kaisha, Osaka, Japan

[21] Appl. No.: 258,178

[22] Filed: Oct. 14, 1988

[30] Foreign Application Priority Data

Oct. 14, 1987 [JP] Japan .................. 62-259088

[51] Int. Cl.⁵ .................. G09G 1/04; H04N 17/00
[52] U.S. Cl. .................. 315/368; 358/139
[58] Field of Search .................. 315/368; 358/10, 139

[56] References Cited

U.S. PATENT DOCUMENTS

| | | | |
|---|---|---|---|
| 3,804,531 | 4/1974 | Kosaka et al. | 358/10 |
| 4,593,309 | 6/1986 | Uno et al. | 358/10 |
| 4,642,529 | 2/1987 | Penn | 315/368 |
| 4,686,429 | 8/1987 | Fendley | 315/368 |
| 4,746,970 | 5/1988 | Hosokawa et al. | 358/10 |

FOREIGN PATENT DOCUMENTS 59-74780  4/1984  Japan .

Primary Examiner—Gregory C. Issing
Attorney, Agent, or Firm—Joseph W. Price

[57] ABSTRACT

A device for measuring convergence of color cathode ray tube including means for producing a white measurement pattern on a viewing screen of the color cathode ray tube, a color image pickup device for picking up the white measurement pattern on the viewing screen, a memory unit for storing color signals transmitted from the color image pickup device, a discrimination unit for discriminating which of blue, green, and red phosphors glows every picture elements of the color image pickup device based on signals from adjacent picture elements, and a calculation unit for a finding out a misconvergence from discriminated results assures an accurate convergence measurement by one time of image pickup only.

11 Claims, 17 Drawing Sheets

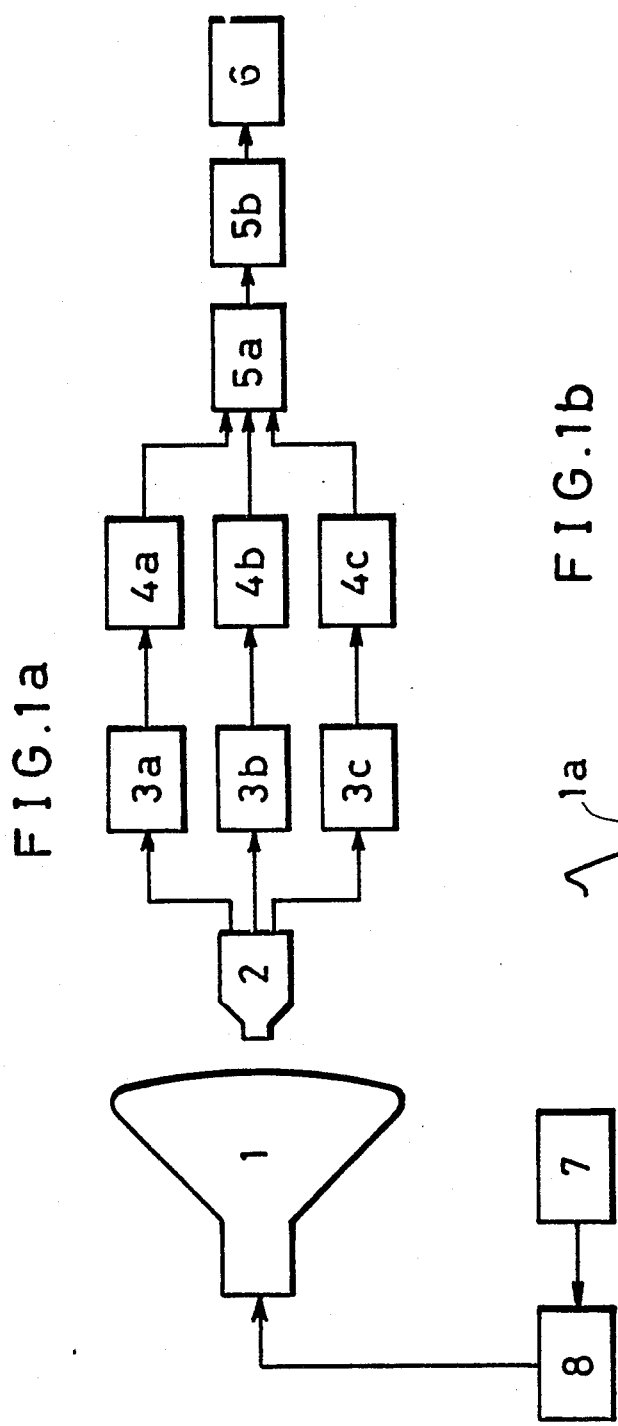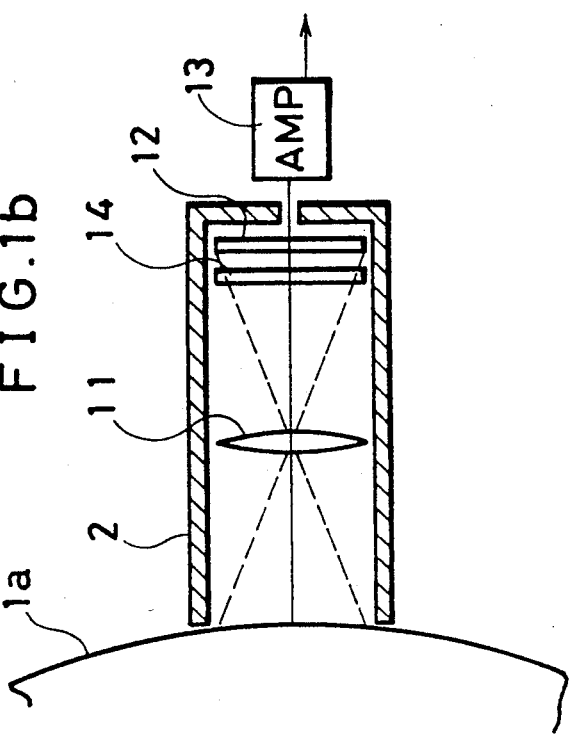

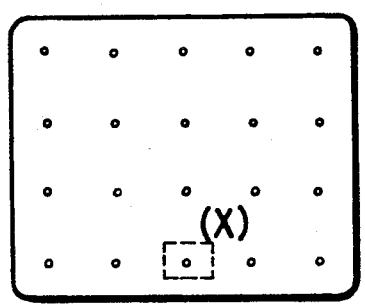
FIG.4a
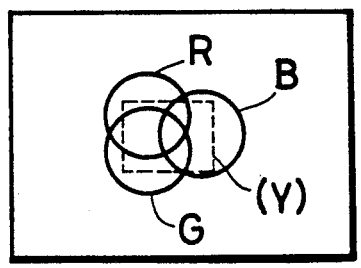
FIG.4b
FIG.4c
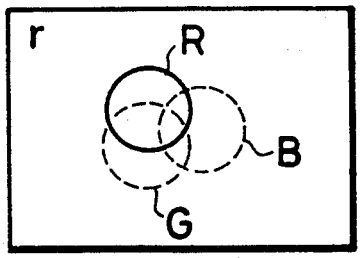 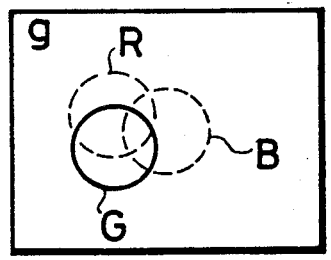 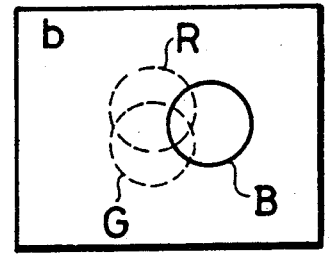
FIG.4d
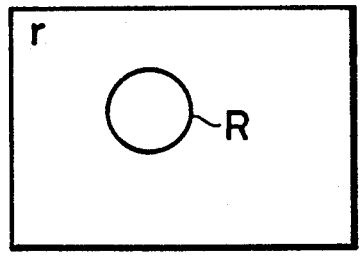 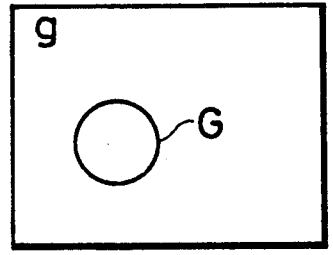 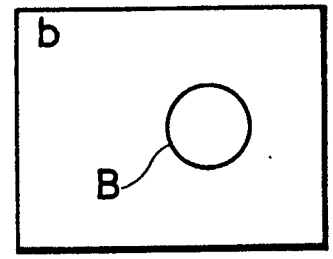

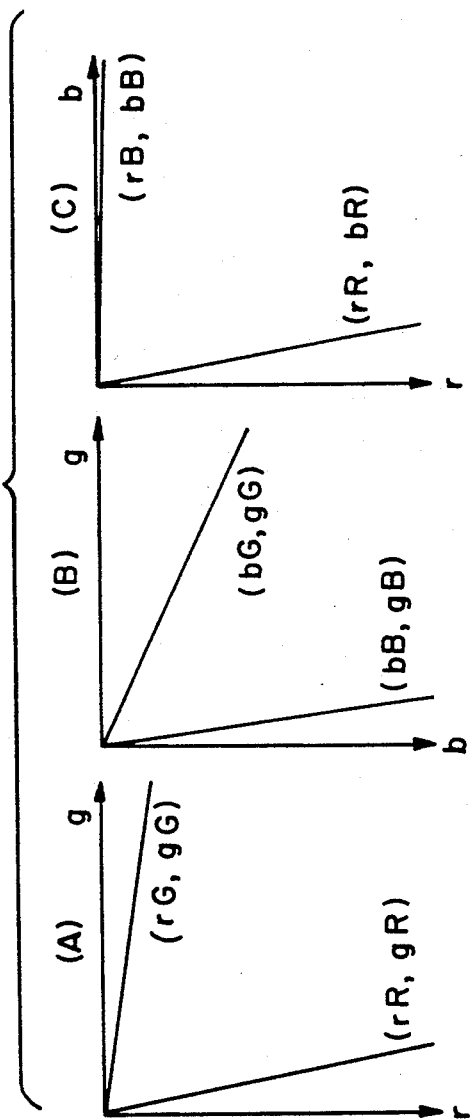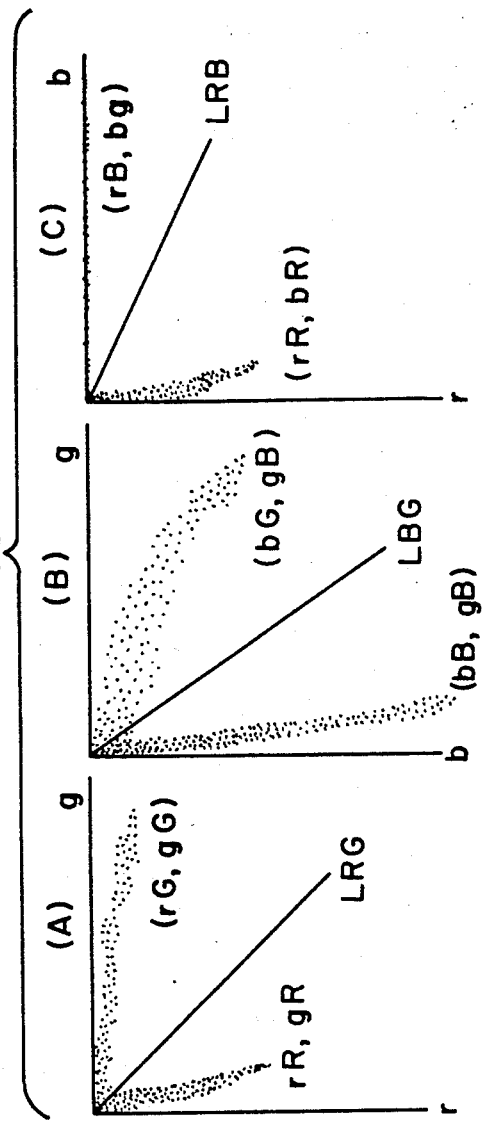

FIG.12a
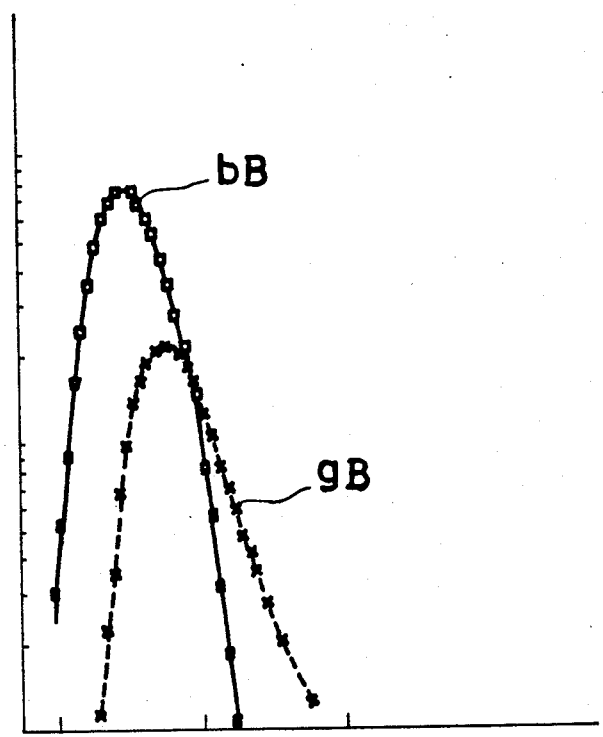
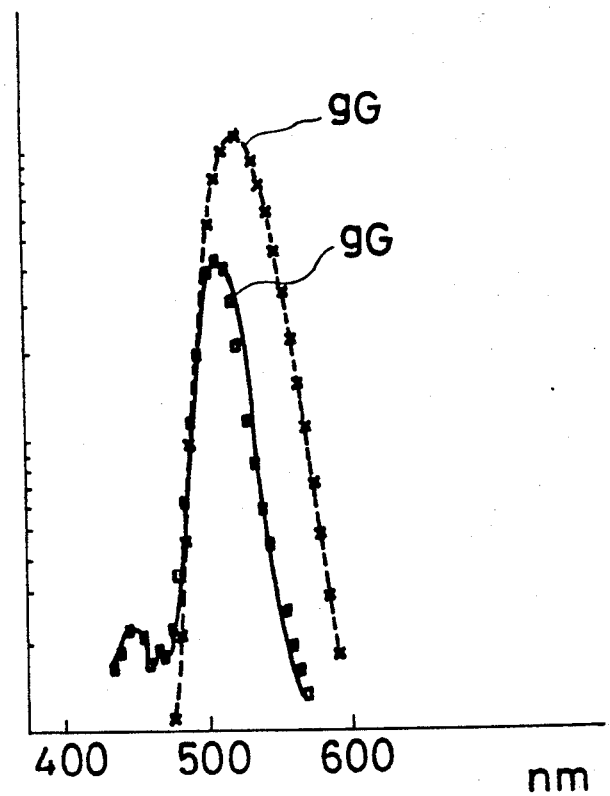

FIG.12b
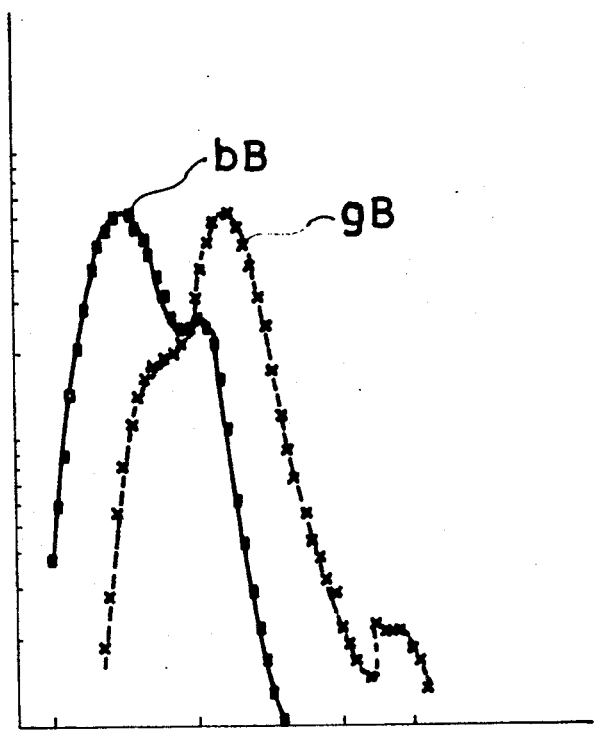
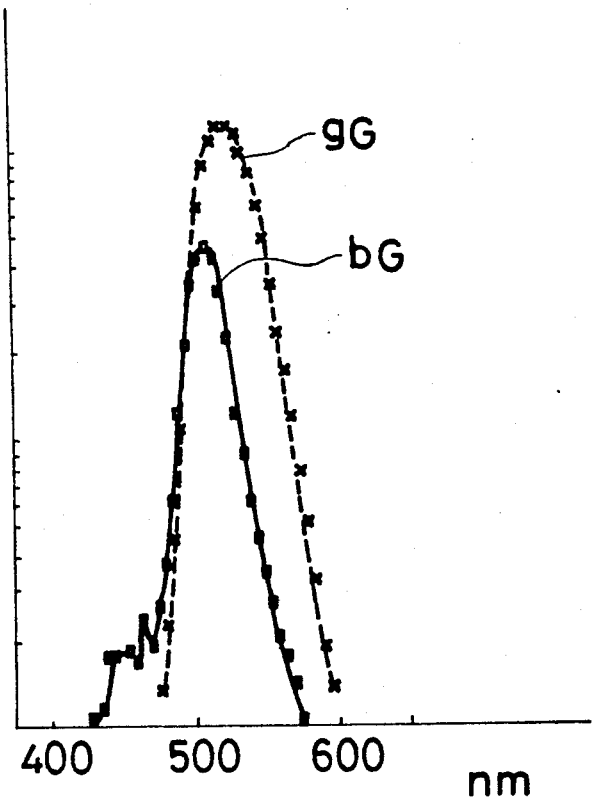

DEVICE FOR MEASURING CONVERGENCE OF COLOR CATHODE RAY TUBE

BACKGROUND OF THE INVENTION AND RELATED ART STATEMENT

This invention relates to a device for measuring the convergence of three electron beams of a color cathode ray tube (referred to as CRT hereinafter), i.e., red beam, green beam, and blue beam.

Conventional convergence measurement devices for color CRT require two times or more of image pickup. For example, in a device of Japanese Unexamined Patent Publication No. 59-74780, all the phosphor dots of a viewing screen of a color CRT are firstly glowed at the same time to produce an entire white pattern. The pattern is picked up with changing color filters by a color filter changing device so that respective positions of red, green, and blue phosphor dots are specified and then put into memory.

Next, a measurement pattern is glowed in which centers of red, green, and blue glow images coincide with one another. The measurement pattern is picked up without color filters to obtain positional information of the measurement pattern in the form of a group of glowing phosphor dots. Positions of the glowing phosphor dots of the measurement pattern are compared with the specified positions of red, green, and blue phosphor dots to obtain a measurement pattern of each color of blue, green, and red which is identical to a measurement pattern picked up in each color. The luminous center of gravity of the measurement pattern of each color are then calculated to find any misconvergence.

It would be seen that the above-mentioned device requires four cycles of image pickup, specifically, three cycles of an image pickup in order to specify positions of phosphor dots, and one cycle in order to obtain positional information of a measurement pattern, consequently requiring a longer measuring time. Also, it will be seen that the conventional device carrying a color filter changing device requires mechanical operation, which consequently causes the maintenance to be cumbersome and also the size larger.

It could be understood that if using a color image pickup device having color filters, it may be eliminated to additional provide a color filter changing device. Also, it could be understood that convergence measurement may be completed at only one time of image pickup because signals for each color are obtainable at the same time. However, the following problems remain.

As shown in FIG. 2, phosphor dots applied on the viewing screen of a color CRT have a wide range of frequency in respect of emission characteristics. As shown in FIG. 3, color filters used in a color image pickup device have a wide range of frequency in respect to spectral characteristics. With FIG. 2, for example, blue phosphor dots are glowed in a wave length range of about 400 nm to about 540 nm. When a color image pickup device receives light from the glow blue phosphor dots, blue picture elements (b) of the pickup device, being covered with blue filters, generate a great magnitude of output because the blue filter permits a large amount of the light of 400 nm to 540 nm to pass therethrough as shown in FIG. 3.

Green picture elements (g) of the pickup device are covered with green filters which permit light of 450 nm to 540 nm to pass therethrough. Consequently, the picture elements (g) generate a perceivable magnitude of output.

Red picture elements (r) of the pickup device are covered with red filters which permit light of 540 nm or more to pass therethrough but permit a smaller amount of light to pass than the green filter (g). Consequently, the red picture elements (r) generate a smaller magnitude of output.

As mentioned above, even when one kind of electron beam is irradiated, the blue, green, and red picture elements of the image pickup device generate their respective signals at the same time. Accordingly, when convergence measurement is carried out based on a white pattern which is produced by putting the three electron beams into work at the same time, it is very difficult to discriminate which of the three electron beams causes the detected signals. Consequently, an accurate convergence can not be obtained.

SUMMARY OF THE INVENTION

It is an object of the present invention to provide a device for measuring the convergence of a color CRT which assures an accurate convergence with only one cycle of image pickup.

According to the present invention, a device for measuring the convergence of a color cathode ray tube having phosphors of different colors comprises means for producing a white measurement pattern on a viewing screen of the color cathode ray tube, a color image pickup device including a plurality of picture elements for picking up the white measurement pattern on the viewing screen, a memory unit for storing color signals transmitted from the color image pickup device, a discrimination unit for discriminating, at each position of the picture element receiving light from a glow phosphor, color of the phosphor based on stored signals from the picture element at a position and adjacent picture element thereof, and a calculation unit for determining any misconvergence from the discriminated results.

According to the present invention, also, a device for measuring the convergence of a color cathode ray tube having phosphors of different colors comprises means for producing a white measurement pattern on a viewing screen of the color cathode ray tube, a color image pickup device including a plurality of picture elements for picking up the white measurement pattern on the viewing screen, a memory unit for storing color signals transmitted from the color image pickup device, means for inputting performance characteristics of the color CRT, means for detecting a glowing point from the stored signals, means for discriminating which color phosphor gives light to a picture element of the glowing point based on outputs of picture elements near the picture element of the glowing point, means for finding out luminance and positional information of a glowing phosphor corresponding to the picture element of the glowing point based on input values from the inputting means, means for finding out positional information of other phosphors near the glowing phosphor based on the input values and the positional information of the glowing phosphor, and means for finding out a misconvergence from the luminance and positional information of glowing phosphors.

Accordingly, a device of the present invention, which includes a color image pickup device, requires no more than one cycle of image pickup and can thus complete a convergence measurement in a shorter time. Also, since a color image pickup device used in the present invention carries color filters on picture elements thereof, a device of the present invention requires no filter changing device, consequently eliminating such mechanical operation as changing of filters and rendering the size smaller and the maintenance easier.

Furthermore, a device of the present invention can eliminate the problem that light from glow phosphor dots of one color is mixed with light from glow phosphor dots of another color when using a color image pickup device, and accordingly can provide a more accurate determination of misconvergence.

These and other objects, features and advantages of the present invention will become more apparent upon a reading of the following detailed description and drawings.

BRIEF DESCRIPTION OF THE DRAWINGS

FIGS 1(a), 1(b) are diagrams showing an entire construction of a device of the present invention;

FIGS. 4(a), 4(b) are diagrams showing white measurement patterns;

FIGS. 4(c), 4(d) are diagrams showing images obtained by picking up the white measurement patterns;

FIGS. 10(a), 10(b) are diagrams showing output characteristics of red, green, and blue picture elements;

FIGS. 12(a), 12(b) are diagrams showing spectral characteristics of output ratios gG/bG, gB/bB of picture elements, FIG. 12(a) showing measurement of RBG type of color CRT, FIG. 12(b) showing measurement of RBLG type of color CRT;

DETAILED DESCRIPTION OF PREFERRED EMBODIMENTS OF THE INVENTION

Figure 2:
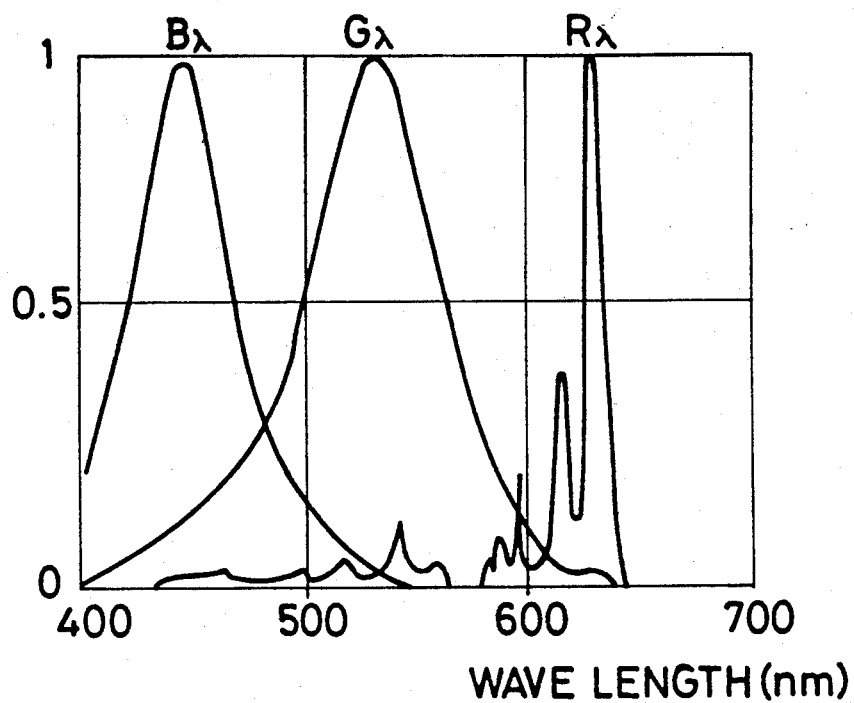
FIG. 2 is a graph showing emission characteristics of phosphor dots applied over a viewing screen of a color CRT.
Figure 3:
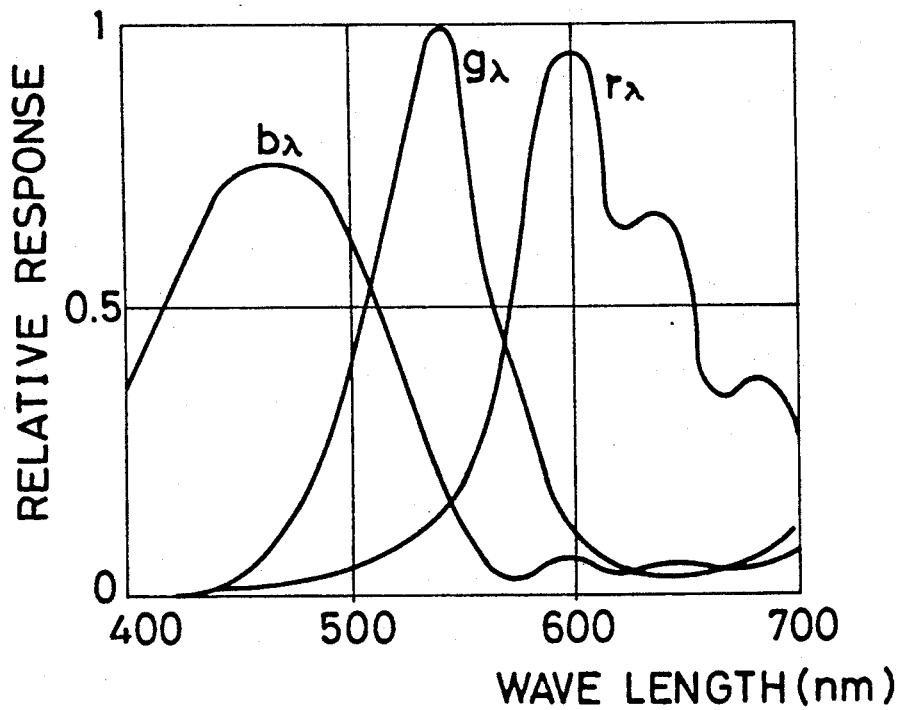
FIG. 3 is a graph showing spectral characteristics of color filters used in a color image pickup device.

FIGS. 1(a), 1(b) show a construction of an embodiment of the present invention. Indicated at 1 is a color CRT to be measured. Indicated at 2 is a color camera which photographs a specified area of the viewing screen of the color CRT 1 by a lens 11, an optical filter 14, an color image pickup device 12. The color image pickup device 12 includes a greater number of picture elements and a color separating filter. Analog signals of each color are transmitted from the picture elements through an amplifier 13.

Indicated at 3a, 3b, and 3c are AD converters for converting analog signals of each color to digital signals of each color. Indicated at 4a, 4b and 4c are memories for storing digital signals of each color. Indicated at 5a is a discrimination unit for discriminating which electron beams cause phosphor dots of the color CRT 1 to glow from signals stored in the memories 4a, 4b and 4c. Indicated at 5b is a calculation unit for calculating an amount of misconvergence from a glow image of each color discriminated by the discrimination unit 5a. Indicated at 6 is a display for indicating a calculated misconvergence. Indicated at 7 is a pattern generator for transmitting a measurement pattern signal indicative of a polka-dot pattern or a cross-hatch pattern to a driving unit 8 of the color CRT 1.

The operation of this embodiment will be described with reference to FIGS. 2 through 6.

Firstly, the pattern generator 7 transmits white measurement pattern signal. In accordance with the pattern signal, the driving unit 8 permits three electron guns to simultaneously work to produce a white measurement pattern. A polka dot pattern, as shown in FIG. 4(b), is used as an example of a measurement pattern. A polka dot pattern consists of small circles. The following convergence measurement is carried out based on such a polka dot pattern.

An area (X) of a screen, as shown in FIG. 4(a), is selected as a measurement area. Referring to FIG. 4(b), convergence adjustment has yet not been carried out. Accordingly, three glow circular images caused by blue, green, and red beams do not coincide with one another.

Figure 5A:
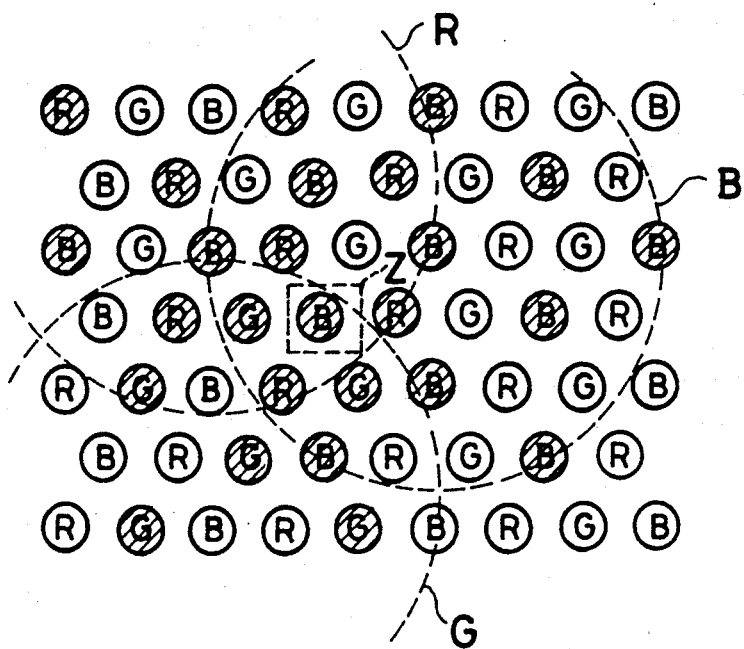
FIG. 5 (a) is a diagram showing an arrangement of phosphor dots over the viewing screen.
FIG. 5(b) is a diagram showing an arrangement of picture elements in a color image pickup device.

As shown in FIG. 5(a) which is an enlarged view of (Y) portion of FIG. 4(b), blue, green, and red phosphor dots are uniformly separately arranged. An irradiation area of each of three beams, represented by broken lines, is considerably larger than the phosphor dot. Consequently, an irradiation image of the beam is made of a group of glow phosphor dots.

Figure 5B:
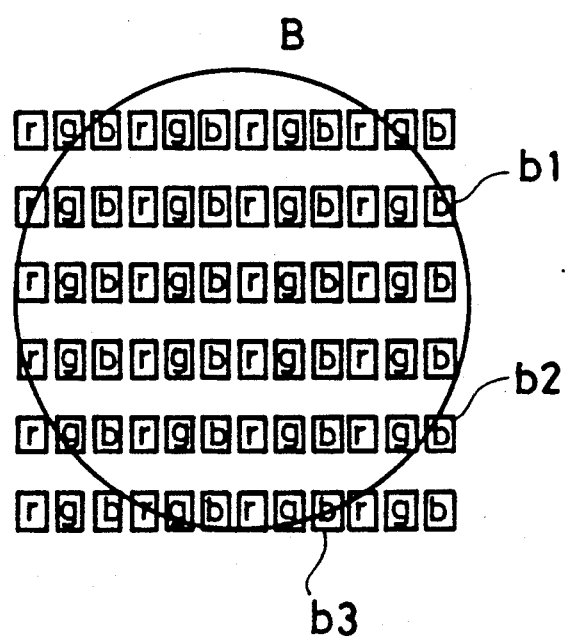

The color image pickup device 12 includes a single color CCD image sensor. FIG. 5(b) enlargedly shows (Z) area of FIG. 5(a). Blue, green, and red picture elements are greatly smaller than the phosphor dots. The picture elements are arranged in the form of substantially uniformly spaced stripes. A glow image of phosphor dot is detected by signals from such picture elements. Analog signals from blue, green, and red picture elements are converted into their respective digital signals by the AD converters 3a, 3b, 3c. The converted digital signals are stored in the memory units 4a, 4b, 4c respectively. Color signals from the picture elements are stored at addresses specified so as to correspond to positions of their respective picture elements.

As shown in FIG. 4(c), however, signals from the color image pickup device 12 includes not only signals concerning one electron beam but also signals concerning the other electron beams due to the emission characteristics of the phosphor dots and the spectral characteristics of the color filters. Consequently, signals stored in the memory have the same information as the color image pickup device. For this, undesirable signals are removed by the discrimination unit 5a.

The discrimination operation will be described below. Firstly, outputs of picture elements of one color are normalized so that a maximum output value of one color picture elements coincide with maximum output values of picture elements of the other colors. Specifically, the color and magnitude of a picture element transmitting a greatest output are found out from the outputs of blue, green, and red picture elements. Outputs of picture elements of the other colors are normalized so that their respective maximum output values coincide with the greatest magnitude value of picture elements of one color. However, it should be noted that blue, green, and red picture elements need not be placed at the same position as shown in FIG. 5(b). Accordingly, it is necessary to give a presumption. As an example, it is deemed that signals transmitted from a set of adjacent blue, green, and red picture elements are the ones transmitted from substantially the same point. As another example, a signal from a particular position is found out by interpolation calculation from signals of picture elements which are closely near to each other and have the same color.

Figure 6:
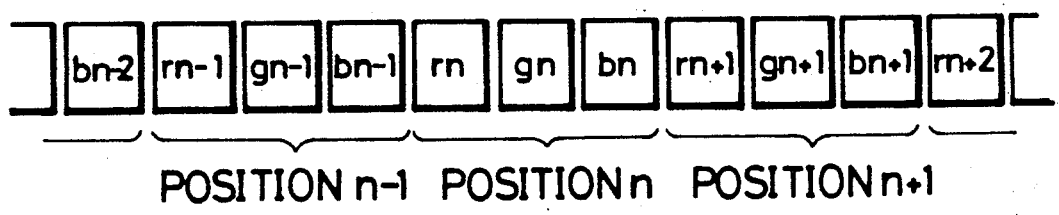
FIG. 6 is a diagram explaining sets of three different color picture elements.

More specifically, as shown in FIG. 6, each set consists of three picture elements having a different color. Indicated at (rn), (gn), and (bn) are respective signals of picture elements constituting a set (n). For example, if a position of the green picture element (g), being at the center position of the set (n), is deemed to be the position of the set (n). Indicated (rn'), (bn') are virtual signals of red and blue picture elements near the green element. As mentioned above, the picture elements are arranged at a uniform space. Accordingly, the virtual signal (rn'), (bn') at the position are as follows:

$rn' = (2rn + rn + 1)/3$ $bn' = (bn - 1 + 2bn)/3$.

Figure 7:
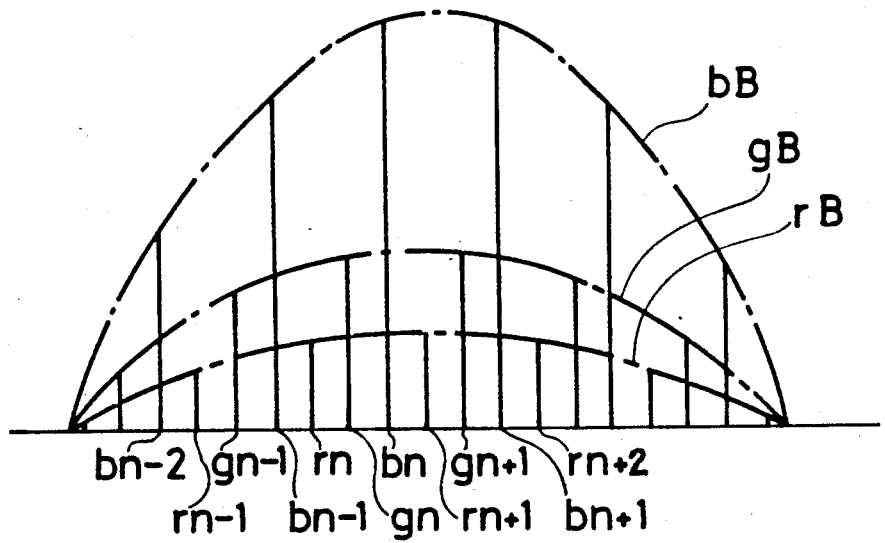
FIG. 7 is a diagram showing signals from picture elements.

Referring to FIG. 7 showing signals of picture elements receiving light from only a blue phosphor dot in an area being picked up, it can be seen that picture elements of each color have their respective signals. Dashed lines (rB), (gB), and (bB) showing virtual outputs of red, green, and blue picture elements at various positions are obtained by interpolation calculation.

Signals of blue, green, and red picture elements which are deemed to be outputs from the same point are compared with one another as Table 1 so as to discriminate which color phosphor dot occupies an arbitrary point (n).

Table 1 shows five comparisons or Items 1, 2, 3, 4, and 5. The Items 1, 2, and 3 refer to comparisons in which signals from a basic position are compared with virtual signals obtained by interpolation calculation. The Items 4 and 5 refer to comparisons in which an assumption that signals from closely near picture elements are ones from the same position, signals from the closely near picture elements are compared with one another.

Figure 8:
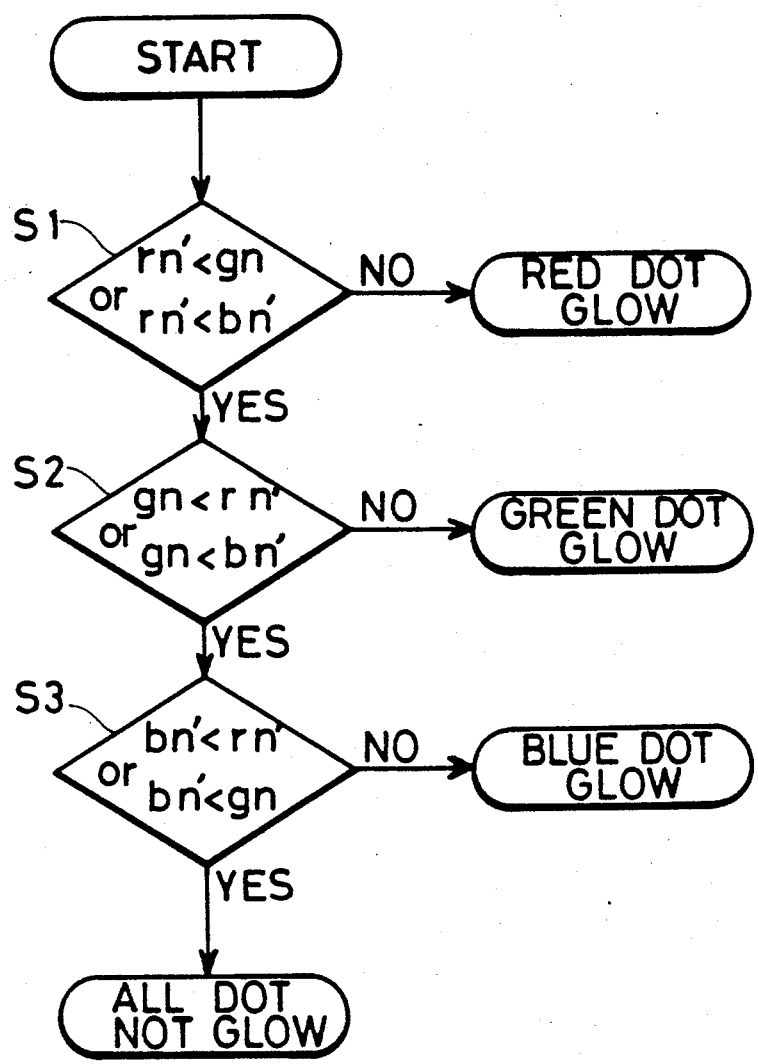
FIG. 8 is a flow chart showing a color discrimination procedure of a discrimination unit.

FIG. 8 is a flow chart showing a discrimination procedure of Item 1 of Table 1. In Item 1, the position of a green picture element g is a basic position. Also, signals of the green element g and virtual signals are used. The virtual signals are obtained by interpolation calculation from signals of the other color picture elements.

TABLE 1

| Item | Color Discrimination at Position n content | | result |
|---|---|---|---|
| 1 | $rn' < gn$ | or $rn' < bn'$ | not red |
|   | $gn < rn'$ | or $gn < bn'$ | not green |
|   | $bn' < rn'$ | or $bn' < gn$ | not blue |
| 2 | $rn < bn''$ | or $rn < gn'$ | not red |
|   | $gn < rn'$ | or $gn < bn'$ | not green |
|   | $bn < gn''$ | or $bn < rn''$ | not blue |
| 3 | $rn < gn-1$ | or $rn < gn$ | not red |
|   | $gn < rn$ | or $gn < bn$ | not green |
|   | $bn < gn$ | or $bn < gn+1$ | not blue |
| 4 | $rn < gn$ | or $rn < bn-1$ | not red |
|   | $gn < rn$ | or $gn < bn$ | not green |
|   | $bn < gn$ | or $bn < rn+1$ | not blue |
| 5 | $rn < gn-1$ | or $rn < bn-1$ | not red |
| or | $rn < gn$ | or $rn < bn$ | |
|   | $gn < bn-1$ | or $gn < rn$ | not green |
| or | $gn < bn$ | or $gn < rn+1$ | |
|   | $bn < rn$ | or $bn < gn$ | not blue |
|   | $bn < rn+1$ | or $bn < gn+1$ | |

$bn' = (bn-1 + 2bn)/3$, $bn'' = (2bn-1 + bn)/3$
$rn' = (2rn + rn+1)/3$, $rn'' = (rn + 2rn+1)/3$
$gn' = (gn-1 + 2gn)/3$, $gn'' = (2gn + gn+1)/3$

At step S1, firstly, it is determined whether rn' is smaller than gn, or rn' is smaller than bn. If it is NO, it is determined that red picture elements glow at the position n. Consequently, the procedure is stopped. If it is YES, it is determined that red picture elements do not glow. Then, the procedure advances to Step S2.

At Step S2, it is determined whether gn is smaller than rn', or gn is smaller than bn'. If it is NO, it is determined that green picture elements glow at the position n. The procedure is stopped. If it is YES, it is determined that green picture elements do not glow. Then, the procedure advances to Step S3.

At Step S3, it is determined whether bn' is smaller than rn', or bn' is smaller than gn. If it is NO, it is determined that blue picture elements glow at the position n. The procedure is stopped. If it is YES, it is determined that any picture elements do not glow. Similarly, the procedure is stopped.

In Item 1 of Table 1, basic positions n are set at positions of green picture elements. In Item 2, basic positions are set at positions of picture elements of color to be measured.

In Items 3 and 4, assuming that adjacent picture elements are close or near to one another, their respective signals are directly compared with one another. Item 5 is a combination of Item 3 and Item 4.

It should be noted that if an image pickup device is used which includes three color CCD image sensors, and positioning of red, green, and blue picture elements is perfectly carried out, the above-mentioned interpolation is not required, and signals from red, green, and blue picture elements corresponding to the same position are directly compared with one another.

As mentioned above, it is desirable to discriminate which color phosphor dots occupy each of the picture elements, or which color phosphor dots do not glow.

In other words, a glow pattern image of each color, which is shown in FIG. 4(d), is separately obtained. A misconvergence is then obtained from respective center positions of the glow pattern images and is indicated on the display 6.

Figure 9:
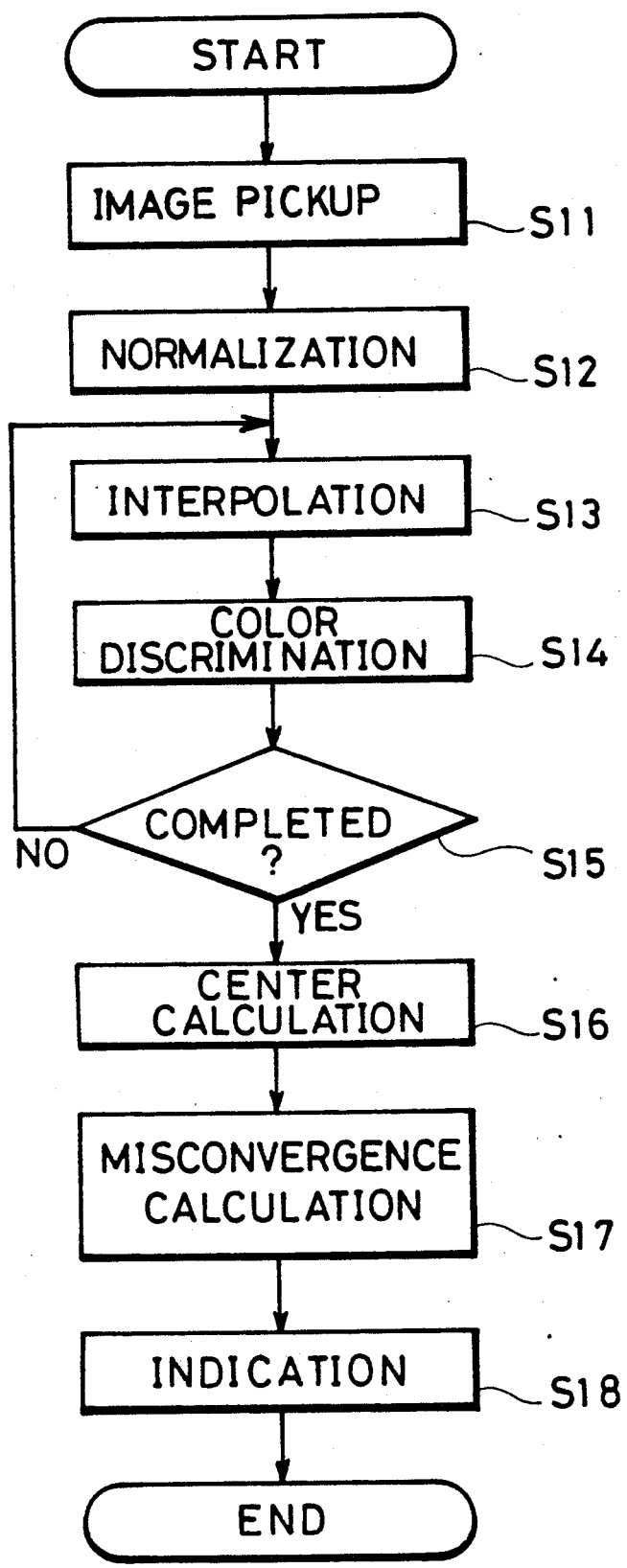
FIG. 9 is a flow chart showing determination of a misconvergence.

Referring to FIG. 9 showing the above-mentioned operation, the color image pickup device 12 sends measurement pattern signals of each color to the memories 4a, 4b, 4c at Step S11. At Step S12, the measurement pattern signals are normalized so that their respective maximum values coincide with one another. At Step S13, interpolation calculation is executed in order to compare signals of one color picture elements with signals of another color picture elements at the same position. At Step S14, it is discriminated which color phosphor dot occupies each picture elements of the color image pickup device from virtual signals obtained by the above interpolation calculation, for example, as the flow chart of FIG. 8. It should be noted that color discrimination may be carried out in accordance with Items 2, 3, 4, and 5 of Table 1 in addition to Item 1. At Step S15, it is checked whether color discrimination is carried out for all the picture elements of the color image pickup device. At Step S16, the center of each color is calculated from a glow image of each color. At Step S17, a misconvergence is calculated from the center of each color. At Step S18, finally, the misconvergence is indicated on the display 6.

The above-mentioned color discrimination is carried out on the premise that the output of a particular picture element becomes larger than those of two different color picture elements adjacent to the particular element due to color filters. For example, in the case of picking up blue phosphor dots on the viewing screen of a color CRT as shown in FIG. 5(b), it is premised that output of a blue phosphor dot of the color image pickup device is greater than those of red and green phosphor dots adjacent to the blue phosphor dot.

In color cathode ray tubes, however, there are not only a RGB type of color cathode ray tube but also RGLB type of color cathode ray tube and RGW type of color cathode ray tube which are used for computer display devices. Specifically, RGLB type of color cathode ray tube has light blue phosphor dots in place of blue phosphor dots. The light blue phosphor dot is made of a mixture of blue phosphor material and green phosphor material. RGW type of color cathode ray tube has white phosphor dots in place of blue phosphor dots. The white phosphor dot is made of a mixture of red phosphor material, green phosphor material, and blue phosphor material.

Accordingly, in RGLB and RGW types of color cathode ray tubes, there is a possibility that the above-mentioned premise is broken down due to unsuitable adjustment of the color temperature of white color.

Furthermore, even if the above-mentioned premise is established, there is a possibility that when color discrimination is carried out by merely comparing outputs of three kinds of phosphor dots as mentioned above, errors occur in the color discrimination. This is due to the fact that when picking up blue phosphor dots, outputs of green phosphor dots become greater. Also, this is due to the fact that picture elements corresponding to the boundary line of a glow phosphor dot, for example, phosphor dots b1, b2, and b3 shown in FIG. 5(b), partly receive light and thus generate a small magnitude of output.

Below will be described a second color discrimination which eliminates the above-mentioned disadvantages of the preceeding color discrimination.

Specifically, the second discrimination is carried out by comparing output ratios of three kinds of picture elements with one another.

Referring to FIG. 2, indicated at $R\lambda$, $G\lambda$, and $B\lambda$ are respective emission characteristics of red, green, and blue phosphor dots when they receive a uniform intensity of red, green, and blue electron beams. With FIG. 3, indicated at $4\lambda$, $g\lambda$, and $b\lambda$ are respective spectral characteristics of red, green, and blue picture elements of the color image pickup device.

The following determinants (1) shows respective outputs rR/gR/bR, rG/gG/bG, rB/gB/bB of red, green, and blue picture elements of the color image pickup device when picking up glow images of red, green, and blue phosphor dots which are glowed by red, green, and blue electron beams having intensities of KR, KG, KB respectively.

$$\begin{vmatrix} rR \\ gR \\ bR \end{vmatrix} = \int KR \cdot R\lambda \cdot \begin{vmatrix} r \\ g \\ b \end{vmatrix} d\lambda$$

$$\begin{vmatrix} rG \\ gG \\ bG \end{vmatrix} = \int KG \cdot G\lambda \cdot \begin{vmatrix} r \\ g \\ b \end{vmatrix} d\lambda \qquad (1)$$

$$\begin{vmatrix} rB \\ gB \\ bB \end{vmatrix} = \int KB \cdot B\lambda \cdot \begin{vmatrix} r \\ g \\ b \end{vmatrix} d\lambda$$

Wherein, for example, rR represents output of a red picture element receiving light from a glow red phosphor dot, and gR represents output of a green picture element receiving light from a glow red phosphor dot bR represents output of a blue picture element receiving light from a glow red phosphor dot.

It should be noted that in the determinants (1), emission characteristics of phosphor dots and spectral characteristics of picture elements do not follow intensities of electron beams and are thus uniform. Accordingly, under given specific emission characteristics, outputs of red, green, and blue picture elements are shown as the following determinants (2).

$$\begin{vmatrix} rR \\ gR \\ bR \end{vmatrix} = KR \cdot \begin{vmatrix} rR' \\ gR' \\ bR' \end{vmatrix}$$

$$\begin{vmatrix} rG \\ gG \\ bG \end{vmatrix} = KG \cdot \begin{vmatrix} rG' \\ gG' \\ bG' \end{vmatrix} \qquad (2)$$

$$\begin{vmatrix} rB \\ gB \\ bB \end{vmatrix} = KB \cdot \begin{vmatrix} rB' \\ gB' \\ bB' \end{vmatrix}$$

wherein $$\begin{vmatrix} rR' \\ gR' \\ bR' \end{vmatrix} = \int R\lambda \cdot \begin{vmatrix} r\lambda \\ g\lambda \\ b\lambda \end{vmatrix} d\lambda$$

$$\begin{vmatrix} rG' \\ gG' \\ bG' \end{vmatrix} = \int G\lambda \cdot \begin{vmatrix} r\lambda \\ g\lambda \\ b\lambda \end{vmatrix} d\lambda$$

$$\begin{vmatrix} rB' \\ gB' \\ bB' \end{vmatrix} = \int B\lambda \cdot \begin{vmatrix} r\lambda \\ g\lambda \\ b\lambda \end{vmatrix} d\lambda$$

In almost all cases, a set of red, green, and blue picture elements receive light from phosphor dots of one color. Accordingly, each of the picture element sets is represented by one of the determinants (2).

As an example, when receiving light from green phosphor dots, output ratios of red, green, and blue picture elements are found out from the determinants (2) as follows:

$$gG/rG = gG'/rG'$$

$$gG/bG = gG'/bG'$$

Consequently, it can be seen that output ratios of picture elements do not follow the intensity KR of a green electron beam and have a uniform value. This relation is the same with respect to a red electron beam and a blue electron beam.

FIGS. 10(a), 10(b) show such relations, specifically, outputs of a set of red, green, and blue picture elements receiving light from glow red, green, and blue phosphor dots. Ordinate axes and abscissa axes of diagrams (A), (B), (C) of FIGS. 10(a), 10(b) represent output magnitudes of red, green, and blue picture elements.

FIG. 10(b) shows actual outputs of red, green, and blue picture elements in accordance with red, green, and blue electron beams. Diagram (A) of FIG. 10(b) shows a relation between a green picture element and a red picture element. Diagram (B) of FIG. 10(b) shows a relation between a green picture element and a blue picture element. Diagram (C) of FIG. 10(b) shows a relation between a blue picture element and a red picture element. It will be seen from the diagrams that actual outputs of red, green, and blue picture elements are shown by distributions having perceivable extents. This is because red, green, and blue picture elements are under the influence of luminace scatter due to the fact that picture elements receive light from different positions.

FIGS. 10(a) shows characteristic lines in accordance with the output distributions of FIG. 10(b).

With FIG. 10(a), for example, (rR, gR) represents a ratio between outputs of red picture elements receiving light from glow red phosphor dots and those of green picture elements receiving the same light.

In diagrams (A), (B), (C) of FIG. 10(b), also, separating lines LRG, LBG, LRB are drawn to make the output distributions clear. Respective inclinations of the separating lines are represented by kRG, kBG, kRB.

Accordingly, as shown in Table 2, color discrimination is carried out without the influence of intensities of the red, green, and blue electron beams by comparing output ratios r/g, g/b, b/r of red, green, and blue picture elements with the inclinations kRG, kBG, kRB.

TABLE 2

| content | result |
| --- | --- |
| r/g > RG and r/b > kRB | red |
| r/g < kRG and b/g < kBG | green |
| b/g > kBG and r/b > kRB | blue |

Figure 11:
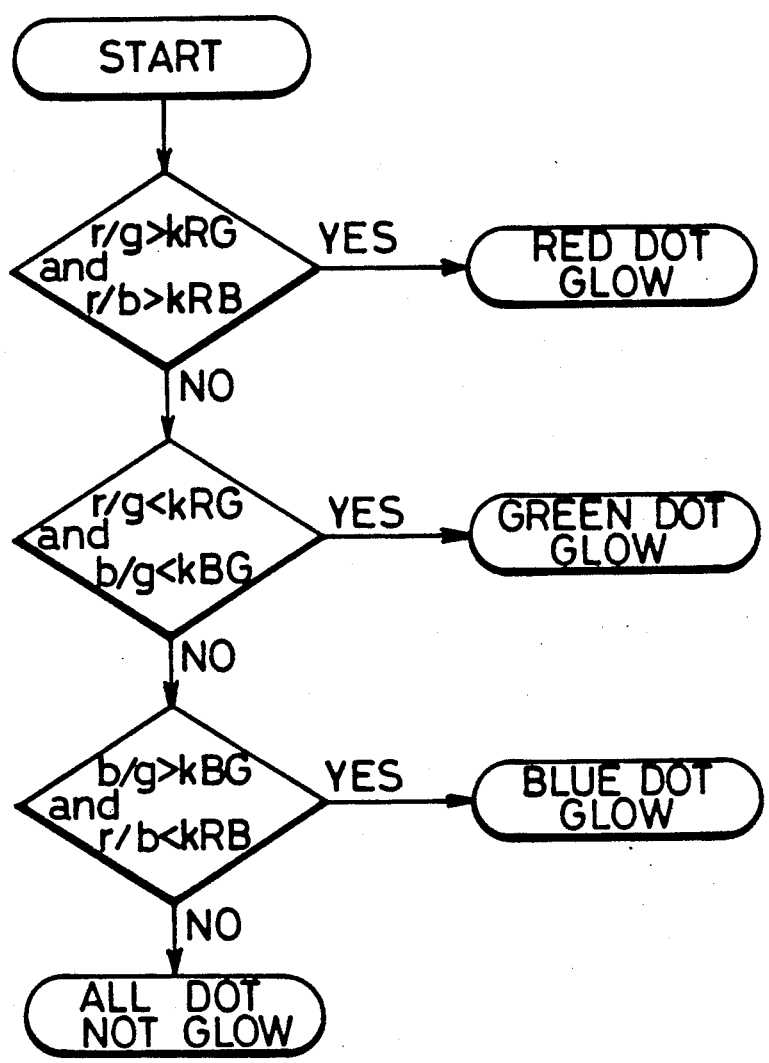
FIG. 11 is a flow chart showing another color discrimination based on the characteristics of FIGS. 10(a), 10(b)

FIG. 11 is a flow chart showing this color discrimination, which corresponds to Step S14 of FIG. 9. It should be noted that before carrying out this color discrimination, outputs of red, green, and blue picture elements are interpolated, if necessary.

The procedure of this flow chart will be described below. Firstly, at Step S21, it is checked whether the output ratio r/g is greater than the inclination kRG, and the output ratio r/b is greater than the inclination kRG. If both output ratios are greater or it is YES, it is determined that red phosphor dots glow. On the other hand, if both output ratios are smaller or one of the output ratios is smaller or it is NO, it is determined that a red phosphor dot does not glow. The procedure advances to Step S22.

At Step S22, it is checked whether the output ratio r/g is smaller than the inclination kRG, and the output ratio b/g is smaller than the inclination kBG. If both output ratios are smaller or it is YES, it is determined that a green phosphor dots glow. On the other hand, if both output ratios are greater or one of the output ratios is greater or it is NO, it is determined that green phosphor dots do not glow. The procedure advances to Step S23.

At Step S23, it is checked whether the output ratio b/g is greater than the inclination kBG, and the output ratio r/b is smaller than the inclination kRB. If the output ratio b/g is greater than the inclination kBG, and the output ratio r/b is smaller than the inclination kRB or it is YES, it is determined that blue phosphor dots glow. On the other hand, if the output ratio b/g is smaller than the inclination kBG and/or the output ratio r/b is greater than the inclination kRB or it is NO, it is determined that all the phosphor dots do not glow. Then, the procedure is stopped.

It should be noted that virtual outputs of red, green, and blue picture elements can be used which are calculated by interpolation as shown in Table 1.

The second discrimination, which eliminates the influence of intensities KR, KG, KB of the electron beams, makes it possible to execute color discrimination without the influence of white color balance adjustment of a color CRT. Also, separation errors can be reduced to a great extent by selecting a suitable separating line in accordance with emission characteristics of phosphor dots.

As mentioned above, in overlapping portions of emission characteristics of phosphor dots or spectral characteristics of picture elements, light from different color glow phosphor dots is liable to impinge on one picture element to cause mixed color. It can be seen that if the intensity of such mixed color is reduced, angles between characteristic lines of FIGS. 10(a), 10(b) become larger and errors in color discrimination are consequently reduced.

For example, a filter for shutting out light having wavelengths corresponding to overlapping portions is provided on the front of the color image pickup device to increase angles between characteristic lines. Specifically, a band filter is used which has such a band as to reduce intensity of mixed color light.

FIGS. 12(a), 12(b) show spectral characteristics of output ratios gG/bG, gB/bB obtained by the determinants (1). FIG. 12(a) shows spectral characteristics of output ratios of an RBG type of color cathode ray tube, FIG. 12(b) shows spectral characteristics of output ratios of RGLB type of color cathode ray tube. In FIGS. 12(a), 12(b), for example, represented at bB is output of a blue picture element receiving light from a glow blue phosphor dot, represented at gB is output of a green picture element receiving light from a glow blue phosphor dot.

Accordingly, for example, outputs of mixed color portions are represented at bG, or gB. It should be seen in FIG. 12(b) that in a RGLB type of color cathode ray tube, green picture elements receive a considerable amount of light from blue phosphor dots.

Figure 13:
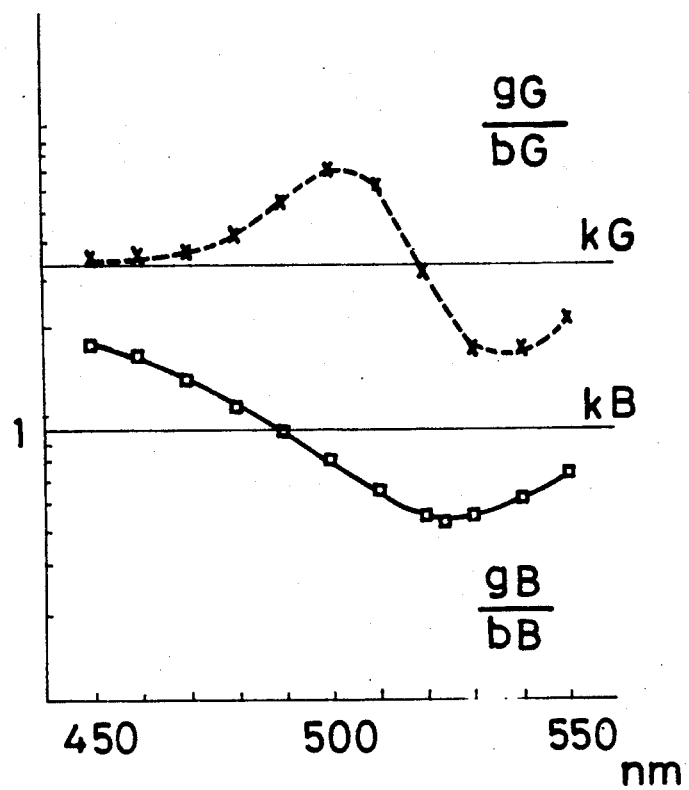
FIG. 13 is a diagram showing characteristics of output ratios gG/bG, gB/bB of picture elements, each using band-pass filter having a band width of 40 nm.

FIG. 13 shows a mixed color removement performance of a band filter having a band of 40 nm, the band filter being used for the RBG type of color cathode ray tube having the characteristics shown in FIG. 12(a) and being moved from a wavelength of 450 nm to a wavelength of 550 nm. In other words, FIG. 13 shows changes of output ratios gG/bG, gB/bB. Represented at kG, kB are inclinations of separating lines in the case of not using a band filter.

With FIG. 13, in an area in which a curve of gG/bG exceeds the line kG, gG becomes greater than bG and accordingly a line representing this output ratio further moves to g axis of FIG. 10(a) (B). Similarly, in an area in which a curve of gB/bB falls below the line kB, bB becomes greater than gB and accordingly a line representing this output ratio further moves to b axis of FIG. 10(a) (B). In other words, if a band filter is provided on the front of the color image pickup device, the band filter having such a central wavelength as to place both output ratio gG/bG above the line kG and output ratio gB/bB below the line kB, angles between lines representing output ratios or red, green, and blue picture elements of FIG. 10(a) becomes greater. Consequently, it can be understood that color discrimination is carried out with ease and at a greatly reduced error.

The above-mentioned color discriminations are made based on outputs of all the red, green, and blue picture elements of a color image pickup device. The following discrimination is made based on positional information of glow red, green, and blue phosphor dots of a color CRT.

In phosphor dots of the usual color CRTs, there are a number of sizes and forms. However, given the types of color cathode ray tube they have their own respective specified size and form. Also, it should be noted that no fluorescent material is coated over the viewing screen other than the phosphor dots.

This color discrimination is briefly as follows. Firstly, it is executed to detect a particular one of the picture elements receiving light from a glow phosphor dot. Secondly, it is executed to detect the glow phosphor dot and its color. Thirdly, it is executed to calculate positions of adjacent same color phosphor dots from results of the preceeding step and the positional information of phosphor dots, and then to find out an image concerning the color from the calculated positions and output magnitudes of the plurality of picture elements. Colors of images of other phosphor dots are found out in the same way. Consequently, images of red, green, and blue phosphor dots is obtained and misconvergence is then calculated.

Below will be described this color discrimination in detail.

Figure 14:
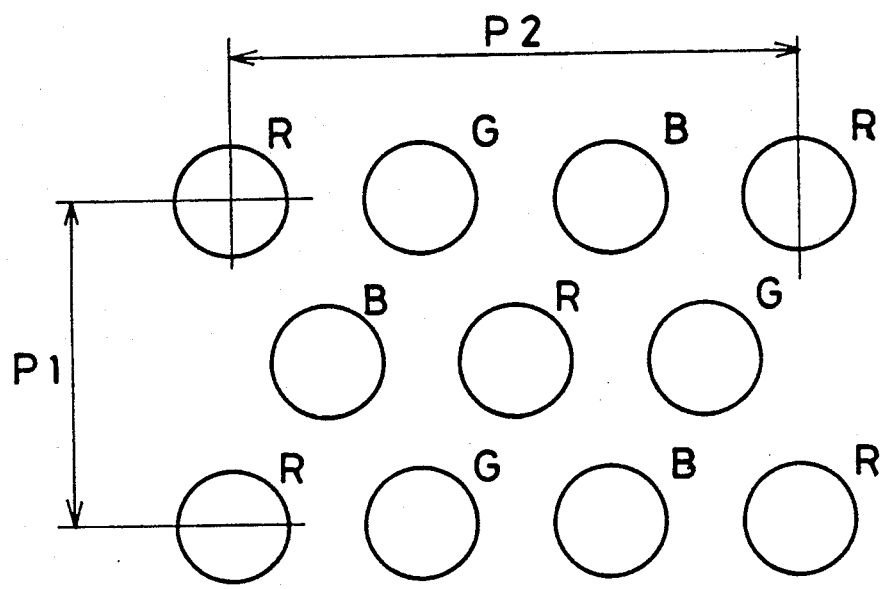
FIG. 14 is a diagram showing a distribution of phosphor dots in dot type of color CRT.

Before measuring, such information as type of a color cathode ray tube to be measured, arrangement order of phosphor dots, and pitch between phosphor dots is put into the discrimination unit 5a or other memory units. FIG. 14 shows an arrangement of phosphor dots over the viewing screen. Phosphor dots are arranged in a horizontal direction in order of red, green, blue. The same color phosphor dots are arranged in a vertical direction on every one row. Also, one row of phosphor dots and the row just below that row are 180 degree out of phase. An area other than phosphor dots does not glow even when electron beams are irradiated. Indicated at P1 is a vertical pitch and at P2 a horizontal pitch.

Figure 15:
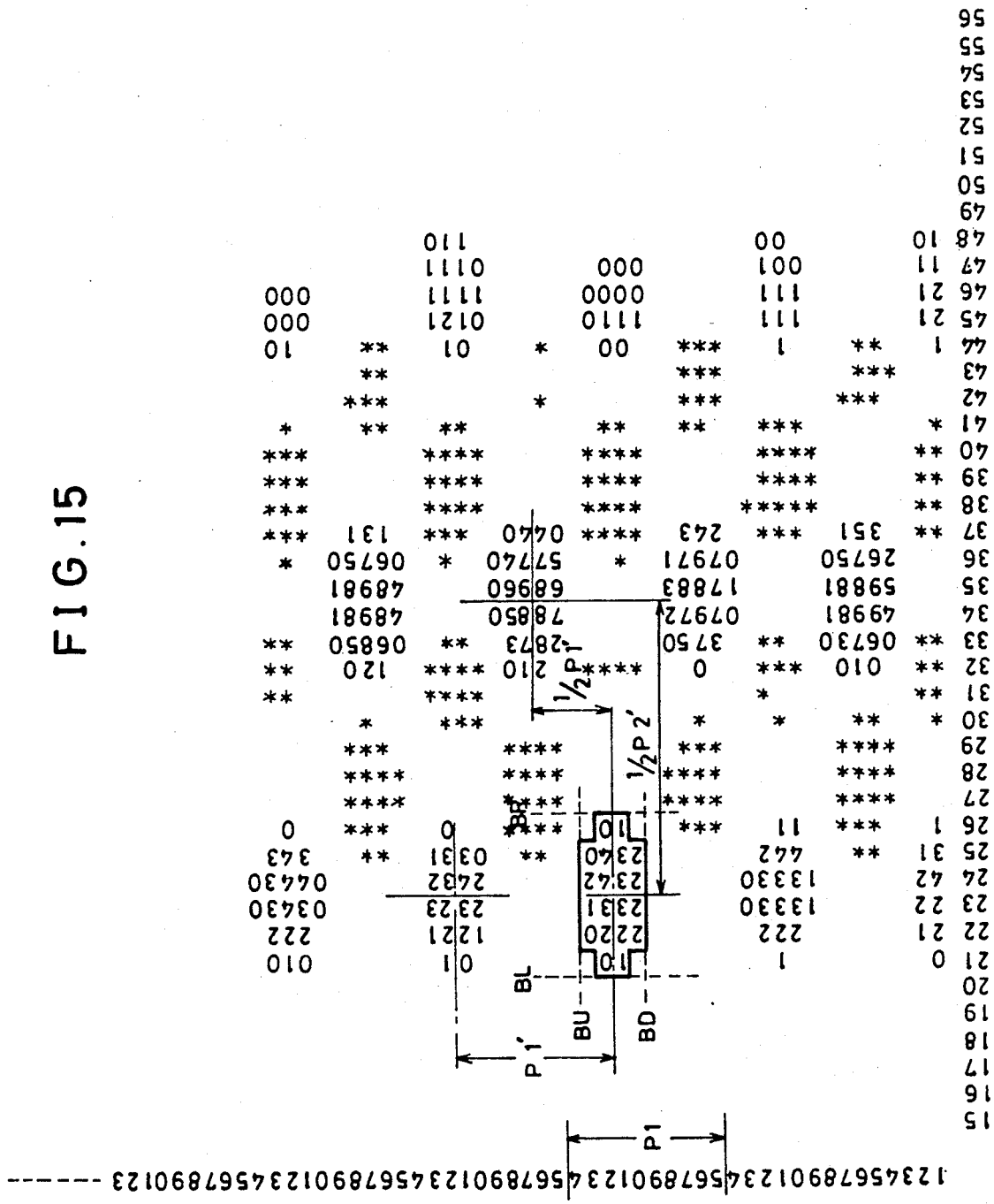
FIG. 15 is a diagram showing a part of a measurement pattern image stored in a memory.

FIG. 15 shows signals stored in the memories 4a, 4b, 4c and representing a part of a glow image of a measurement pattern. Numerals represent output magnitude of a picture element receiving light from a glow phosphor dot. Output magnitude is indicated by ten steps or 0-9. Reference character * represents positions of picture elements receiving light from other color glow phosphor dots. Also, an arbitrary glow phosphor dot is enclosed by lines. The upper, lower, left, and right positions of the glow phosphor dot are indicated at BU, BD, BL, and BR respectively. A particular point of a glow phosphor dot, for example, a position of a picture element issuing output more than a given level with respect to the glow phosphor dot, is called a glowing point. Also, indicated at P1', P2' are a vertical distance and a horizontal distance between a phosphor dot and the vertical and horizontal next phosphor dots having the same color. P1', P2' are indicated by the number of picture element.

A measurement pattern image is picked up by the color image pickup device 12 and stored in the memories 4a, 4b, and 4c and then discriminated in respect of color in the discrimination unit 5a.

Figure 16:
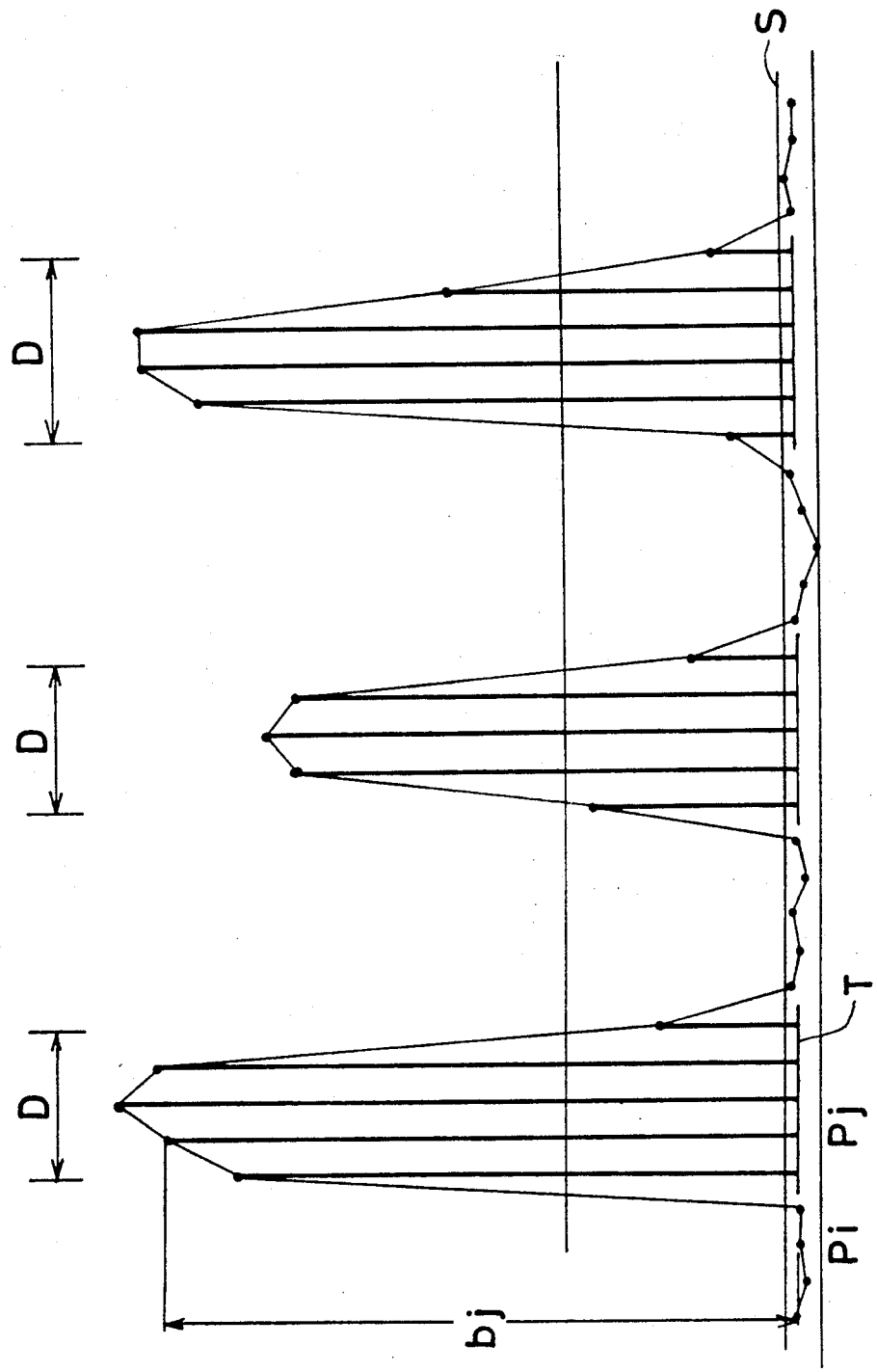
FIG. 16 is a diagram showing a signal distribution of an area near a glow phosphor dot, the distribution being obtained by picture elements of one color.

More specifically, firstly, measurement pattern image signals stored in the memories 4a, 4b, and 4c are scanned to detect a glow phosphor dot. A glow phosphor dot is determined based on whether the output of a given picture element is above a predetermined level. FIG. 16 shows outputs of picture elements receiving light from adjacent three glow phosphor dots having the same color. Indicated at D is a scanned distance of the phosphor dot. It should be seen from FIG. 16 that a level for detecting a glow phosphor dot is set higher than maximum outputs of picture elements receiving no light. Accordingly, glow phosphor dots are assuredly detected without the influence of scatters of outputs of picture elements receiving no light, boundaries of phosphor dots and measurement pattern image.

A glowing point is determined in the following way. Firstly, a rough position of a measurement pattern image is found out. Secondly, a particular area of the measurement pattern image, for example, from line 15 to line 24 of FIG. 15, is scanned for every picture elements of P1' corresponding to the pitch P1 of FIG. 14 to detect a first picture element having an output equal to or more than a glow detection level of FIG. 16, for example, a level of 3. Referring to FIG. 15, specifically, if scanning every line form an earlier line and column, a picture element of line 21 and column 23 is consequently detected. As another example of detecting a glowing point, after the above-mentioned area is entirely scanned, a picture element issuing a maximum output of the area is then determined to be a first glowing point. Accordingly, another detection makes it possible to detect not only a glowing point but also the color of the glowing point. Also, another detection can eliminate the boundary influence.

Next, it is carried out to discriminate the color of the phosphor dot including the detected glowing point. This color discrimination is carried out in the above-mentioned ways. More specifically, color is detected by comparing the output of the picture element receiving light from the glow phosphor dot with outputs of other different color picture elements directly or after interpolation calculation. Alternatively, as in the second color discrimination, color is detected by comparing output ratios of different color picture elements. These color discriminations are carried out based on outputs of picture elements above a given level. Accordingly, low outputs of picture elements corresponding to the boundary of the glow phosphor dot are omitted and a chance of wrong discrimination is consequently eliminated. After such color discrimination is carried out with respect to several point around the discriminated picture element in the glow phosphor dot, a color which is discriminated the most times or is discriminated more than a given rate is determined to be the color of the particular glow phosphor dot. Furthermore, as yet another color discrimination, preliminary color discrimination of each phosphor dot is carried out from outputs of the at least one picture elements. A color which is discriminated the most times in the preliminary discrimination is determined to be the color of the phosphor dots. This color discrimination eliminates errors even more.

After one of the picture elements receiving light from a particular phosphor dot is detected, picture elements adjacent to the detected one are scanned to detect picture elements issuing outputs. With FIG. 15, the scanning is started from the picture element of line 21 and column 23 to detect picture elements on the same line and issuing perceivable outputs. After left and right borders of the line of the glow phosphor dot is determined by the scanning, the scanning is executed over picture elements on the next line to detect picture elements adjacent to the picture element of line 21 and column 23 and issuing perceivable outputs. This scanning is repeatedly executed to obtain an entire image of the glow phosphor dot, which is the one enclosed by the solid line in FIG. 15.

In this scanning, luminance and luminance moment of the glow phosphor dot for every picture element are calculated and then integrated in an entirety of the glow phosphor dot to obtain luminance and luminance moment of the phosphor dot. Thereafter, a luminous center of gravity of the glow phosphor dot is calculated.

Also, as shown in FIG. 15, if upper, lower, left, and right boundary positions BU, BD, BL, BR of the glow phosphor dot is detected in the scanning, the center position of the glow phosphor dot is able to be calculated.

From a calculated luminous center of gravity of the glow phosphor dot, and arrangement of information of the phosphor dots, the positions of adjacent phosphor dots are calculated. With FIG. 15, the center position of the first glow phosphor dot is at a position of line 21.5 and column 23.5. The position of the next upper phosphor dot of the same color is calculated to be line 31.5 and column 23.5 from the positional information of the first phosphor dot and the number of picture element P1' corresponding to the pitch P1 of FIG. 14. Also, the position of the next right phosphor dot of the same color is calculated to be line 26.5 and column 33.5 from the positional information of the first phosphor dot and the number of picture element P2' corresponding to the pitch P2 of FIG. 14.

Thereafter, scanning is re-started over picture elements adjacent to the picture element corresponding to the calculated position of the next phosphor dot to detect picture elements issuing an output more than a given level and to draw an entire image of the next phosphor dot.

If a head of the color image pickup device is inclined with respect to the viewing screen of the CRT, there is a likelihood that the center position of the next phosphor dot obtained from its entire image does not coincide with the calculated center position of the next phosphor dot. Such uncoincidence is corrected in the following way. An amount of uncoincidence is firstly calculated. Subsequent calculation is carried out based on a correction value taking into account the uncoincidence amount. The calculation, being carried out based on a correction value, provides a more accurate position estimate of adjacent phosphor dots. As another way, the center position of phosphor dot obtained from the above-mentioned image determination can be newly set as a new starting point. This prevents uncoincidence from accumulating and provides a reduced influence of inclination of a color image pickup device.

Repetition of the above-mentioned operation produces an entire measurement pattern image of a particular color while eliminating other colors. After the operation with respect to one color is completed, the operation with respect to other colors is carried out to obtain entire measurement pattern images of other colors. It should be noted that it is possible to produce an entire measurement of pattern images of other colors without color discrimination because colors of other different color phosphor dots can be found out from the arrangement information of phosphor dots. Thereafter, luminous centers of gravity of the entire measurement pattern of images of red, green, and blue are calculated from the obtained entire measurement pattern images. Consequently, a misconvergence is found out.

Figure 17:
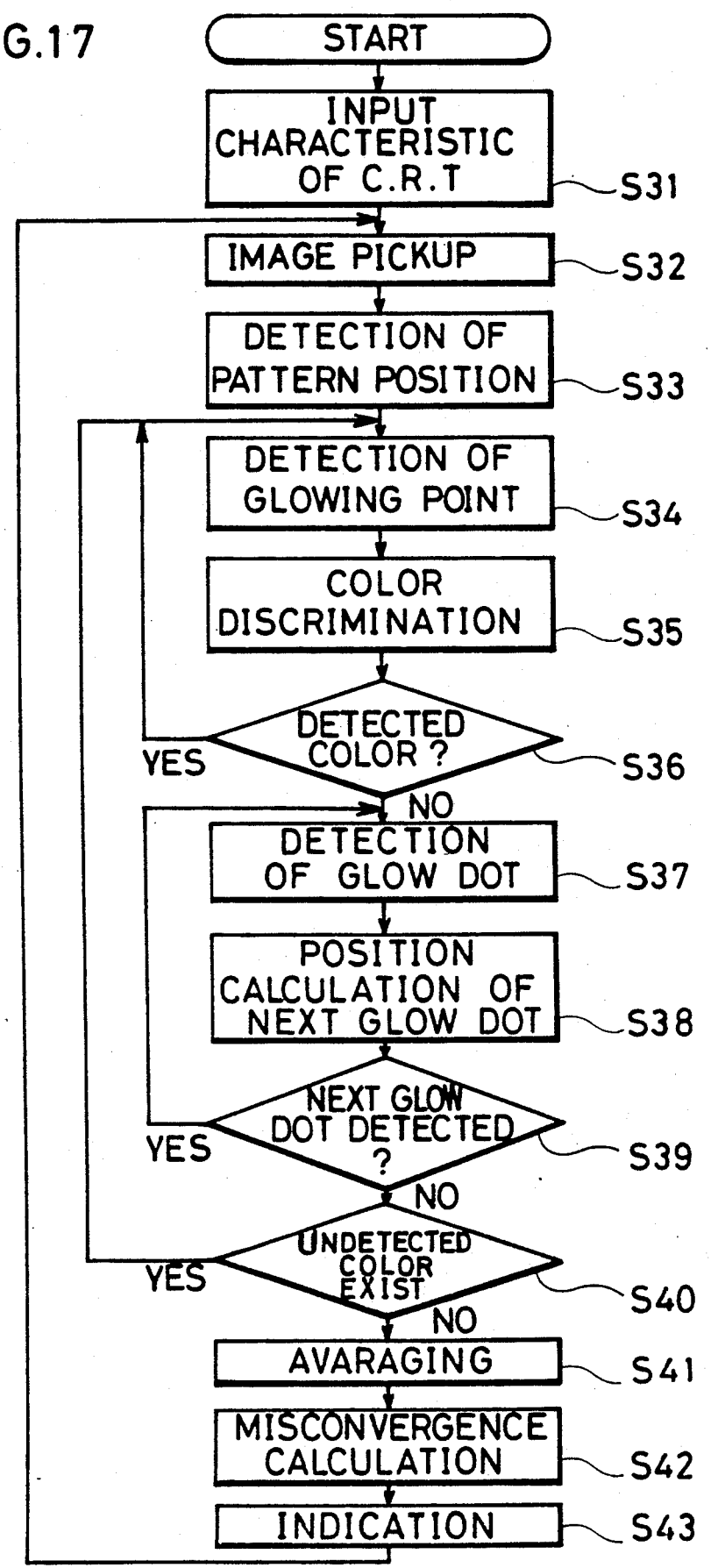
FIG. 17 is a flow chart showing a third color discrimination based on positions of picture elements.

FIG. 17 is a flow chart showing the above-mentioned operation.

At Step S31, characteristic information of a color cathode ray tube to be measured, such as arrangement information of phosphor dots, is put into a memory. At Step S32, a measurement pattern is picked up by the color image pickup device 12. At Step S33, a position of the measurement pattern is detected. This position detection is carried out to set in advance a picture element area which is necessary to calculate a misconvergence. The area is slightly larger than an actually necessary area. An area outside the set area is not scanned and a rapid measurement is thus obtained.

At Step S34, scanning is started from a given picture element to detect a first glowing point. At Step S35, the glow phosphor dot is detected from the glowing point. Then, the color of the glow phosphor dot is discriminated based on outputs of picture elements receiving light from the glow phosphor dot. Consequently, the color of other phosphor dots of the same color is detected. At Step S36, it is checked whether the discriminated color is already detected color. If the detected color is a first color, the procedure advances to Step S37 at which an entire image of the glow phosphor dot is drawn to find out the center position of the glow phosphor dot. At Step S38, the position of the next phosphor dot having the same color is calculated from the center position of the first glow phosphor dot, pitch and arrangement information of phosphor dots. At Step S39, it is checked whether the picture element corresponding to the calculated center position of the next phosphor dot issues a signal. Steps S37, 38, and 39 are repeatedly practiced until all the area set at Step S33 is scanned to provide a NO at Step S39. At Step 40, it is checked whether all of the color discrimination is not completed or undetected color exists. If it is YES, color discrimination with respect to the next color is carried out. Specifically, the procedure feeds back to Step S34 to re-start the procedure of Steps 34, 35, 36, 37, 38, 39, and S40 with respect to the next color. As mentioned above, color discrimination is carried out for each color. Consequently, the results are obtained with a greatly reduced error.

With respect to a final color, similarly, the above-mentioned Steps of S34 to S40 are practiced.

Color discrimination of all the phosphor dots within the area is completed to provide a NO at Step 40, the procedure then advances to Step 41 at which an averaging operation is carried out to remove noises. This average operation will be described later. At Step S42, a misconvergence is calculated. At Step S43, a calculated misconvergence is indicated.

It can be seen that the third procedure is not influenced by abrupt luminance decreases of picture elements corresponding to the boundary of a phosphor dot and can thus eliminate discrimination error to an increased extent. Also, the third procedure which requires a reduced time of scanning picture elements and a reduced number of calculation assures a shorter time of measuring and an improved measurement response.

Also, it can be checked with ease whether a measurement pattern is properly picked up by the color image pickup device. In the third procedure, specifically, positions of phosphor dots obtained by the color image pickup device can be checked based on the already input information on pitch ad arrangement of phosphor dots. More specifically, a size of a glow phosphor dot can be detected from positional information obtained in the procedure. If the detected size of a glow phosphor dot is larger than an estimated maximum size of the glow phosphor dot obtained from the already input information, signals or informations obtained by the color image pickup device are determined to be incorrect. Also, if no boundary of a glow phosphor dot is detected even when scanning an area beyond an estimated maximum size, signals obtained by the color image pickup device are determined to be incorrect. When determined to be incorrect, an error message is indicated. Alternatively, the procedure may be continued by changing the noise correction amount to a proper amount.

Accordingly, it can be seen that the above-mentioned checking operation eliminates the influence of a fixed pattern noise in output signals of picture elements. When using a solid picking up element in a color image pickup device, such fixed pattern noise is liable to occur in output signals of picture elements due to scatters of dark outputs of the picture elements. Also, dark outputs of picture elements are sensible to temperature. Even if dark outputs of picture elements are corrected with respect to temperature, proper measurement can not be carried out due to a change in operation temperature. Particularly, when correction is insufficient, there is a likelihood that a picture element receiving no light incorrectly issues a glow signal. It should be apparent that the third procedure can eliminate such incorrect measurement. Furthermore, the third procedure can eliminate undesirable that are liable to occur due to light from surroundings and flares which are produced on the viewing screen by reflected light from a face plate of the color CRT.

The above-mentioned color discrimination is carried out based on outputs of picture elements. As mentioned above, however, outputs of picture elements includes outputs produced by light from surroundings and flares on the viewing screen in addition to light from glow phosphor dots. Also, output of picture elements involves dark output noises of a color image pickup device and noises produced in process units with an A/D converter. Accordingly, there is a likelihood that if measuring based on such outputs including undesirable noises, measuring results are greatly incorrect.

Below will be described a procedure of removing such noises.

With FIG. 16, indicated at D is an area in which picture elements receive an image of a glow phosphor dot. In an area outside the area D, low outputs can be seen which are produced by the above-mentioned noises.

A correction procedure will be described which eliminates outputs due to noises in the area outside the area D.

Before measuring, firstly, outputs of the picture elements receiving no light are stored in a memory. Secondly, a correction amount is calculated from the stored outputs. Specifically, the above operation is repeated several times to detect maximum output of each of the picture elements. Detected maximum outputs are stored in another memory. As another procedure, maximum output of picture elements of each color may be set as correction amounts. In measurement, actual outputs which are lower than the correction amount are determined to be zero.

When flares occur near phosphor dots, the output is then corrected, so that a sufficient correction is given against flare.

When an incorrectness is detected in color discrimination, a new correction amount is made by adding an arbitrary amount to the above correction amount and color discrimination is then carried out again based on outputs corrected by the new correction amount, this operation being repeated until any incorrectness vanishes. In this procedure, when the correction of the correction amount is executed only near phosphor dots, noises producing incorrectness are deemed to be the ones due to flares. On the other hand, when the correction is required even outside the measurement pattern, the initially set correction amount is determined to be wrong. Accordingly, an new initial correction amount is calculated.

Next, a correction will be described which is used in the area D.

In the area, outputs produced by noises are superimposed on outputs produced by light from glow phosphor dots. Accordingly, a correction amount for the area D is determined by calculating a mean value of dark output of each picture element at several times of scanning, or by calculating a mean value of dark outputs of the picture elements of each color at several times of scanning. An output which is obtained by subtracting an obtained correction amount from an actual measured output is determined to be that of the glow picture element. In FIG. 16, a correction amount for no glow area or the area outside the area D is set at a maximum output S of dark outputs of all the picture elements, a correction amount for glow area or the area D is set at a mean output T of all the dark outputs. In other words, output of a picture element Pi which is smaller than the maximum output S of the dark outputs is deemed to be in the no glow area and thus set at zero. On the other hand, output of a picture element Pj which is larger than the maximum output S of the dark outputs is deemed to be in the glow area D and thus set at output bj obtained by subtracting the mean output T from the output of the picture element Pj.

Figure 18:
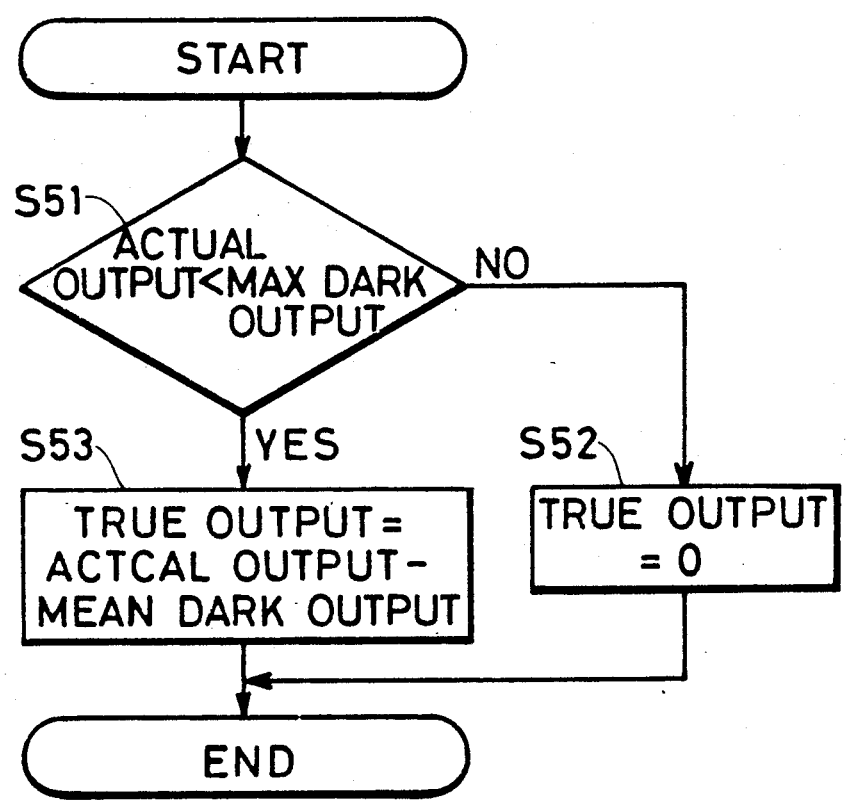
FIG. 18 is a flow chart showing a correction of noise.

FIG. 18 is a flow chart showing the above-mentioned noise correction.

At Step S51, it is determined whether actual output of a picture element is larger than the maximum dark output. If it is NO or the actual output of a picture element is equal to or smaller, the output is deemed to be noise and set at zero at Step S52. On the other hand, if it is YES or the actual output of a picture element is larger, output which is obtained by subtracting the mean output form the output of the picture element is set as a true output of the picture element at Step S53.

Next will be described a second procedure or additional averaging procedure which reduces the influence of irregularly occurring noises.

Such irregular noises come to presence in the form of output a scatter of picture element and cause repeated errors. Particularly, when measuring a color CRT having a tendency of occurring noises, there is liable to be a considerable difference between misconvergences measured with a measurement device and those measured with human eyes.

Specifically, a misconvergence is measured each frame. Accordingly, it would be seen that measurement position on the viewing screen unintentionally changes each frame consequently causing an output of picture element to change and bring about a scatter error in the measurement result. On the other hand, human eyes do not have so high responsiveness as measurement devices. Accordingly, human eyes can not provide a more accurate result than a mean of results of repeated measurements. Consequently, a considerable difference occurs between misconvergences measured with a measurement device and those measured with human eyes.

It is known that by integrating signals having noises, limits of signal-to-noise ratio are improved in proportion to the square root of the integration time.

In the second procedure, irregular noises are eliminated by adding outputs of picture elements or image signals obtained in a frame frequency by the color image pickup device to a predetermined number of times to find out a mean output. Specifically, in addition to the memories for outputs of picture elements, a memory is provided which is used for averaging outputs of picture elements of each color. When memories for the output of picture element are renewed by new outputs of picture elements, the new outputs are added to an old output stored in the averaging memory and added outputs are averaged to obtain a mean output.

In the above-mentioned procedure, averaging is carried out for every picture element. In place of the above-mentioned procedure, however, it may be appropriate that luminous centers of gravity of phosphor dots or measurement patterns are firstly calculated in every image pickup by executing color discrimination from outputs of picture elements, calculated luminous centers of gravity are then averaged. It should be seen that the latter procedure requires no memory for averaging and also a shorter time of calculation.

Furthermore, in place of averaging outputs of picture elements of every image pickup, it may be appropriate that memories for predetermined times of image pickup are provided so as to average the predetermined times of outputs, the oldest output being successively renewed when one image pickup is carried out one by one.

It should be seen that the above-mentioned averaging procedures reduces the influence of irregular noises to assure an improved measurement. It should also be seen that error caused by repeated image pickup can be greatly reduced.

As mentioned above, a color image pickup device includes a great number of picture elements. A phosphor dot is picked up by picture elements which then convert light from the phosphor dot to electric current or output signal. It should be seen that the smaller the size of the picture elements and the closer the picture elements are arranged, the more accurate an image of phosphor dot can be produced. However, there are limits in reduction of the picture element size and in increasing of the magnification of lens for picking up phosphor dots. Accordingly, there is a likelihood that due to unsufficient fixing of the color image pickup device, measuring positions of red, green and blue picture elements are deviated from one another, which erroneously changes the luminance and luminance moment of the phosphor dot. Such change of luminance and luminance moment is not identical with respect to the three colors and accordingly causes a dispersion in measured misconvergence.

It would be apparent that the above-mentioned averaging procedures can provide misconvergence which corresponds to an averaged measuring position and thus has a greatly reduced dispersion.

Furthermore, the above-mentioned averaging procedures can eliminate errors which are caused by relative changes between irradiation positions of electron beams and phosphor dots. Specifically, a measurement pattern is produced on the viewing screen of a color CRT in accordance with signals transmitted from the pattern generator 7. In other words, uniformly spaced glow phosphor dots producing the measurement pattern are picked up. Accordingly, if irradiation positions of the electron beams is changed due to noises or the like, dispersions occurs in measured misconvergences because the luminous center of gravity of each color measurement pattern is changed. The above-mentioned averaging procedures can provide measured misconvergence of a reduced dispersion.

Although the above-mentioned embodiments are described with reference to a color cathode ray tube having phosphor units in the form of dots of three primary colors, i.e., red, green, and blue, it should be understood that the present invention is applicable to a color cathode ray tube having phosphor dots of their respective complementary colors. Also, it should be understood that the present invention is applicable to a color cathode ray tube having phosphor unit in the form of stripes as well as a color cathode ray tube having phosphors in the form of dots.

Furthermore, it should be understood that the foregoing relates to only the scope of the present invention as defined by the appended claims rather than by the description preceding them, and all changes that fall within metes and bounds of the claims, or equivalence of such metes and bounds are therefore intended to be embraced by the claims.

What is claimed is:

1. A device for measuring convergence of color images on a viewing screen on which different color groups of phosphor units are uniformly arranged, each color image being formed as integrated fluorescence from the phosphor units emitted by a corresponding electron beam, said device comprising:

means for detecting fluorescence intensities of the phosphor units, said detecting means comprised of a plurality of detection elements, each group of detection elements having a uniform distribution and a spectral sensitivity corresponding to one of said different color groups;

means, in accordance with the fluorescence intensities, for discriminating which color of fluorescence each detection element has received;

means for obtaining a fluorescence image for each color based on the discriminated color at each detection element, and means for calculating the convergence of the images obtained by the obtaining means.

2. A device as claimed in claim 1, wherein the detection elements are grouped into a red group for detecting a fluorescence intensity in red color, a green group for detecting a fluorescence intensity in green color, a blue group for detecting a fluorescence intensity in blue color, and said device further comprising:

means for interpolating intensities of red and green colors at positions of detection elements of the blue group, based on the intensities detected by other detection elements near the blue detection elements;

means for interpolating intensities of green and blue colors at positions of detection elements of the red group based on the intensities detected by other detection elements near the red detection elements, and means for interpolating intensities of blue and red colors at positions of detection elements of the green group based on the intensities detected by the other detection elements near the green detection element, and wherein the discriminating means includes means for discriminating a color at each detection element in accordance with the detected intensities and the interpolated intensities.

3. A device as claim in claim 2, wherein the discriminating means further includes means for comparing the intensities of each color for all positions of the detection elements, and means for discriminating colors according to a compared result of the comparing means.

4. A device as claimed in claim 2, wherein the discriminating means further includes:

means for calculating intensity ratios of each color at each position of the detection elements;

means for comparing each intensity ratio with a predetermined value, and means for discriminating colors according to compared results in the comparing means.

5. A device as claimed in claim 1, further comprising filters, provided between the viewing screen and the detection elements, for filtering crossover sections between spectral sensitivities.

6. A device as claimed in claim 1 further comprising means for storing the fluorescence intensities of the detecting means, and wherein the discriminating means discriminates colors in accordance with the fluorescence intensities of the storing means.

7. A device for measuring convergence of color images on a viewing screen on which different color groups of phosphor units are regularly arranged, each color image being formed as integrated fluorescence from the phosphor units emitted by corresponding electron beam, said device comprising:

means for detecting fluorescence intensities of the phosphor units, said detecting means comprised of a plurality of detection elements, each group of detection elements having a uniform distribution and a spectral sensitivity corresponding to one of said different color groups;

means for discriminating a first color of the fluorescence of a first detection element;

means for determining a position of a first phosphor unit of said first color by discriminating a color of fluorescence of other detection elements near to the first element;

means for inputting information of the arrangement of the phosphor units on the viewing screen;

means for calculating a fluorescence image for each color based on the position of the first phosphor unit and the inputted information, and means for calculating the convergence between the calculated images.

8. A device as claimed in claim 7, wherein the detecting elements are grouped into a red group for detection of fluorescence intensity in red color, a green group for detection or fluorescence intensity in green color, a blue group for detection of fluorescence intensity in blue color, and said device further comprising:

means for interpolating intensities of red and green colors at positions of detection elements of the blue group, based on the intensities detected by other detection elements near the blue detection elements;

means of interpolating intensities of green and blue colors at positions of detection elements of the red group based on the intensities detected by other detection elements near the red detection elements, and means for interpolating intensities of blue and red colors at positions of detection elements of the green group based on the intensities detected by other detection elements near the green detection element, and wherein the discriminating means includes means for discriminating a color at each detection element in accordance with the detected intensities and the interpolated intensities.

9. A device as claimed in claim 8, wherein the discriminating means includes means for comparing the intensities of each color at each position of the detection elements, and means for discriminating colors according to a compared result of the comparing means.

10. A device as claimed in claim 8, wherein the discriminating means includes:

means for calculating intensity ratios of each color at each position of the detection element;

means for comparing each intensity ratio with a predetermined value, and means for discriminating colors according to compared results in the comparing means.

11. A device as claimed in claim 7 further comprising:

means for inputting size information of the phosphor units, and means for confirming agreement of the determined image and the inputted size.

* * * * *